US011883940B2

(12) United States Patent
Panks

(10) Patent No.: US 11,883,940 B2
(45) Date of Patent: *Jan. 30, 2024

(54) PNEUMATIC PERCUSSIVE TOOL WITH ATTACHMENTS AND METHOD OF USE THEREOF

(71) Applicant: James Kevin Panks, Inman, SC (US)

(72) Inventor: James Kevin Panks, Inman, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,616

(22) Filed: Aug. 3, 2021

(65) Prior Publication Data

US 2021/0362314 A1 Nov. 25, 2021

Related U.S. Application Data

(63) Continuation of application No. 16/291,478, filed on Mar. 4, 2019, now Pat. No. 11,110,580.

(60) Provisional application No. 62/646,577, filed on Mar. 22, 2018.

(51) Int. Cl.
*B25D 17/00* (2006.01)
*B25D 9/16* (2006.01)

(52) U.S. Cl.
CPC ............ *B25D 17/005* (2013.01); *B25D 9/16* (2013.01); *B25D 2217/0042* (2013.01); *B25D 2250/005* (2013.01); *B25D 2250/051* (2013.01); *B25D 2250/171* (2013.01)

(58) Field of Classification Search
CPC .................... B25D 17/005; B25D 9/16; B25D 2217/0042; B25D 2250/005; B25D 2250/051; B25D 2250/171
See application file for complete search history.

(56) References Cited

U.S. PATENT DOCUMENTS

| | | | | |
|---|---|---|---|---|
| 2,400,833 | A | 5/1946 | Lefebvre | |
| 3,049,358 | A | 8/1962 | Polos | |
| 4,818,157 | A | 4/1989 | Kouvelis | |
| 5,638,909 | A | 6/1997 | Henderson | |
| 6,339,974 | B1 | 1/2002 | Kotschner et al. | |
| 7,036,211 | B1 * | 5/2006 | Panks | B25D 9/00 173/29 |
| 7,194,948 | B2 * | 3/2007 | Liu | F16D 65/0043 91/454 |
| 11,110,580 | B2 * | 9/2021 | Panks | B25D 17/005 |
| 2008/0083070 | A1 * | 4/2008 | Huang | B25B 27/0035 7/100 |
| 2008/0093587 | A1 * | 4/2008 | Sodini | B25F 3/00 254/124 |
| 2012/0216380 | A1 * | 8/2012 | Chen | B25B 27/0035 29/267 |

(Continued)

FOREIGN PATENT DOCUMENTS

GB 896886 A 5/1962

*Primary Examiner* — Anna K Kinsaul
*Assistant Examiner* — Lucas E. A. Palmer
(74) *Attorney, Agent, or Firm* — McGarry Bair PC

(57) ABSTRACT

The present disclosure generally relates to quick change attachments for a pneumatic percussive tool. The attachments convert a pneumatic percussive tool, such as an air impact tool with proximal attachment, which has a "pushing" force, into a pneumatic percussive tool having a "pulling" force. Once attached to the pneumatic percussive tool, the attachments also provide a quick change feature for allowing "pulling" tools to be simply and easily removed and replaced.

20 Claims, 7 Drawing Sheets

(56) References Cited

U.S. PATENT DOCUMENTS

| | | | | |
|---|---|---|---|---|
| 2013/0025102 | A1* | 1/2013 | Barnhart | B25F 1/006 29/239 |
| 2015/0047865 | A1* | 2/2015 | Yang | B25F 5/02 173/51 |
| 2015/0129269 | A1 | 5/2015 | Muuttonen et al. | |
| 2017/0087621 | A1 | 3/2017 | Stahl | |
| 2020/0316765 | A1 | 10/2020 | Reitzig | |

* cited by examiner

PNEUMATIC PERCUSSIVE TOOL WITH ATTACHMENTS AND METHOD OF USE THEREOF

CROSS REFERENCE TO RELATED APPLICATIONS

This application is a Continuation Application of U.S. patent application Ser. No. 16/291,478, filed Mar. 4, 2019, now issued as U.S. Patent No. 11,110,580, which claims priority under 35 U.S.C. § 119(e) to U.S. Provisional Patent Application No. 62/646,577, filed Mar. 22, 2018, entitled "PNEUMATIC PERCUSSIVE TOOL WITH ATTACHMENTS AND METHOD OF USE THEREOF," both of which are hereby incorporated by reference herein in their entirety.

BACKGROUND

Percussive pneumatic tools typically use reciprocating or bi-directional pistons to provide a pushing force on an object, such as the use of an air hammer to carve or cut an object. These tools can also be adapted or converted into tools that use the reciprocating or bi-directional pistons to provide a pulling force on an object. For example, mechanical assemblies that utilize friction-fit components, such as fittings and tool bits, must at times be separated. Use of a pneumatic tool having a pulling force can help separate friction fit mechanical assemblies.

Converting a pneumatic percussive tool which has a "pushing" force, into a pneumatic percussive tool having a "pulling" force typically requires use of a complex kit that can be time consuming and complex to implement. Additionally, changing pulling tools during the course of a project is typically difficult and inefficient.

BRIEF SUMMARY

One embodiment of the disclosure is a kit for converting a bi-directional pneumatic percussive tool from a pushing tool to a pulling tool, the tool having a tool body comprising a hollow interior with a distal end and a proximal end, a piston slidable in the hollow interior between the distal end and the proximal end, an opening positioned at the distal end of the tool in communication with the hollow interior. The kit comprising a removable end cap configured to selectively attach to the distal end of the tool and seal the opening and regulate air pressure within the internal cavity, the removable end cap configured to not protrude into the opening or into the hollow interior of the tool.

Another embodiment of the disclosure is a kit for converting a bi-directional pneumatic percussive tool from a pushing tool to a pulling tool, the tool having a tool body comprising a hollow interior with a distal end and a proximal end, a piston slidable in the hollow interior between the distal end and the proximal, an opening positioned at the distal end of the tool adjacent the first attachment coupler in communication with the hollow interior. The kit comprising a quick change chuck having a first end configured to selectively attach to the distal end of the tool and a second end comprising an axially slidable outer casing and a plurality of steel balls, and a pull plug configured to selectively attach to the second end of the quick change chuck to seal the opening and regulate the air pressure within the internal cavity; the pull plug comprising a first end configured to be inserted into the second end of the quick change chuck and having a channel for engagement with the plurality of steel balls; the first end of the pull plug protruding into the quick change chuck but not protruding into the opening or into the hollow interior of the tool.

Another embodiment of the disclosure is a kit for converting a bi-directional pneumatic percussive tool from a pushing tool to a pulling tool, the tool having a tool body comprising a hollow interior with a distal end and a proximal end, a piston slidable in the hollow interior between the distal end and the proximal, an opening positioned at the distal end of the tool adjacent the first attachment coupler in communication with the hollow interior. The kit comprising a pull plug configured to selectively attach to the distal end of the tool to seal the opening and regulate the air pressure within the internal cavity; the pull plug comprising a first end configured to be inserted into the distal end of the tool but not protruding into the opening or into the hollow interior of the tool

DETAILED DESCRIPTION

The present disclosure generally relates to quick change attachments for a pneumatic percussive tool with proximal attachment means. The attachments convert a pneumatic percussive tool, such as an air impact tool with proximal attachment means, which has a "pushing" force, into a pneumatic percussive tool having a "pulling" force. Once attached to the pneumatic percussive tool, the attachments also provide a quick change feature for allowing "pulling" tools to be simply and easily removed and replaced.

Figure 1:
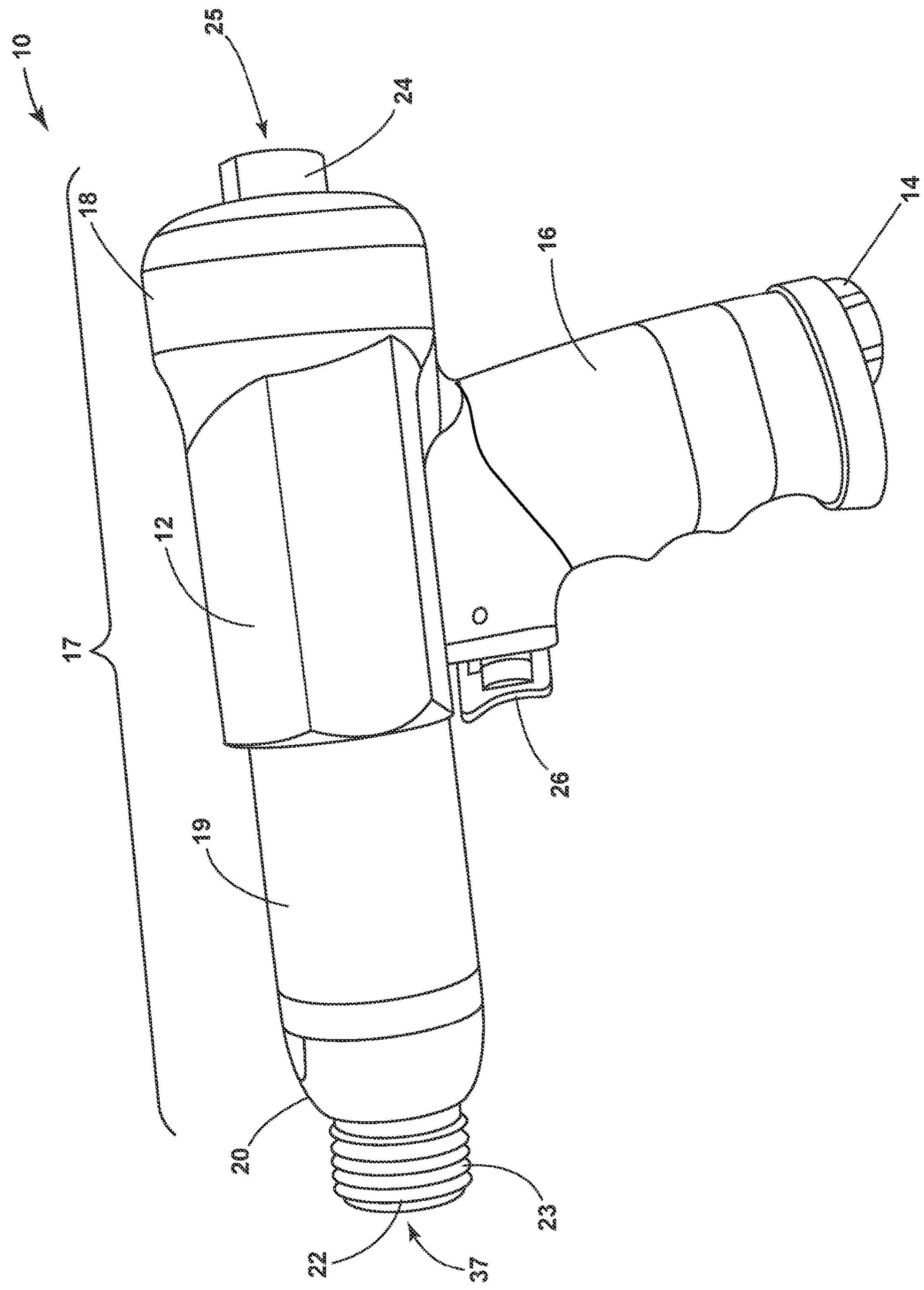
FIG. 1 is a perspective view of a pneumatic percussive tool of the present disclosure.

FIG. 1 illustrates a perspective view of a pneumatic percussive tool 10 in accordance with the present disclosure. The pneumatic percussive tool 10 can generally be an air impact tool with proximal attachment means that provides a pushing force for hammer or chisel bits. The pneumatic percussive tool 10 can be adapted to have a "pulling" force or can act as a dual use tool 10 capable of acting in a pushing and pulling manner.

The pneumatic percussive tool 10 comprises a two piece body 17 having a housing 12 and a barrel 19 that together define a generally cylindrically shape and having a hollow interior. The barrel 19 can be attached to the housing 12 in any number of ways, but in the exemplary illustration the barrel 19 can be screwed in the housing 12. A handle 16 can be integrally formed with the housing 12 and can extend laterally therefrom for providing a gripping mechanism for grasping, holding, and operating the pneumatic percussive tool 10. The handle 16 can comprise a trigger 26 for activating the tool 10. The handle 16 can also comprise an air-intake connection 14 configured to be connected to a compressor (not shown) for supplying air to the tool 10. The housing 12 including the handle 16 can be made from aluminum of other metal or material sufficient to withstand the stresses associated with a pneumatic tool.

The tool body 17 can comprise a proximal end 18 at the rear of the tool 10 and a distal end 20 associated with the front or forward facing part of the tool 10. The distal end 20 can be configured with a first attachment coupler 22 for receiving a first attachment and the proximal end 18 can be configured with a second attachment coupler 24 for receiving a second attachment. In the exemplary illustration, the first attachment coupler 22 can comprise a set of male threads 23 for allowing threaded attachments to be screwed on and attached to the distal end 20 of the tool 10. Similarly, the second attachment coupler 24 can comprise a set of female threads 25 for allowing threaded attachments to be screwed on and attached to the proximal end 18 of the tool 10. The second attachment coupler 24 is contemplated to be a hardened steel insert to withstand the stress associated with a pneumatic percussive tool. As should be recognize, and as will be explained, it is the use of the first and second attachments that converts the pneumatic percussive tool having a "pushing" force into a pneumatic percussive tool having a "pulling" force. In addition, the attachments also provide a quick change feature for allowing "pulling" tools to be simply and easily removed and replaced.

Figure 2:
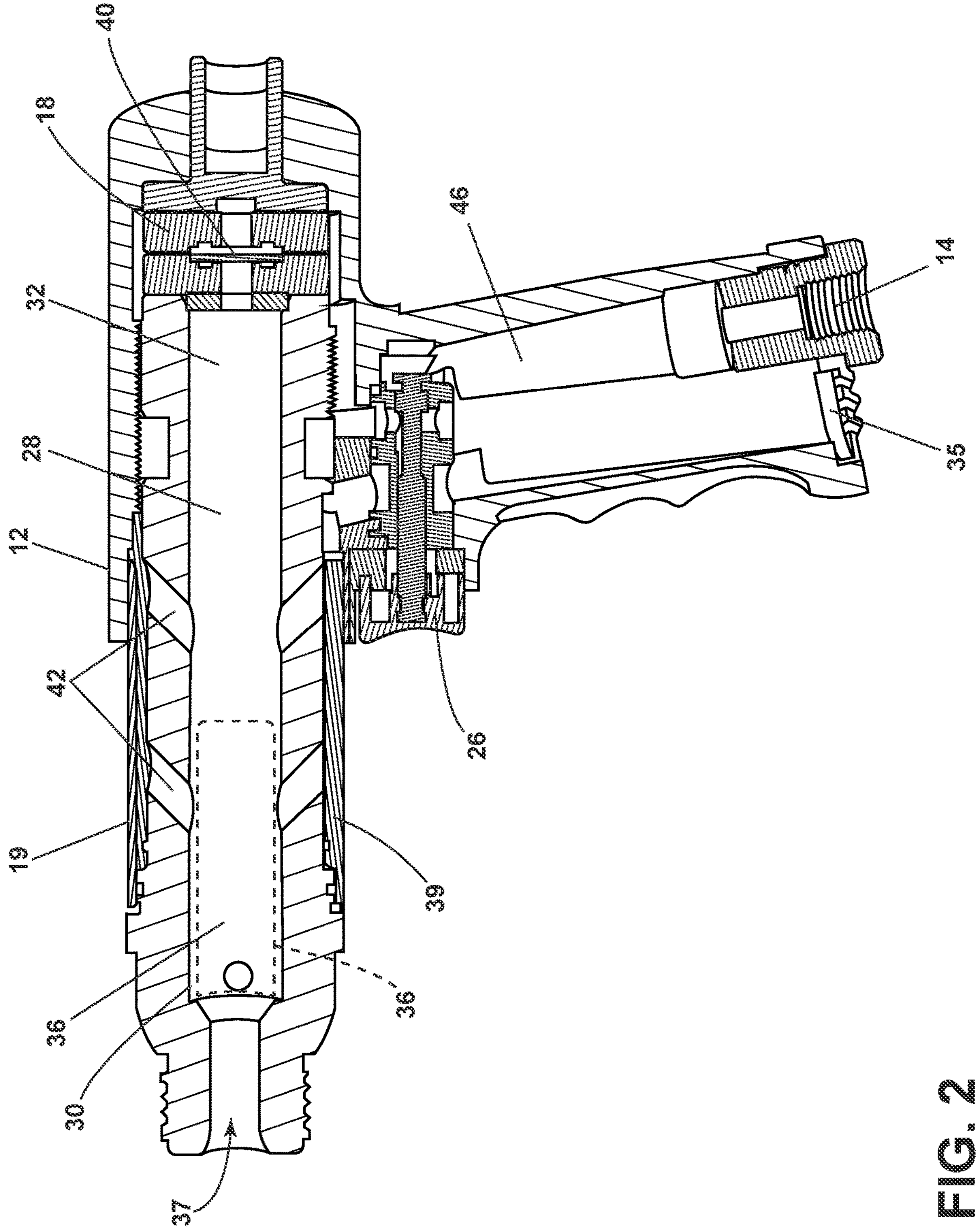
FIG. 2 is a cross-sectional view the pneumatic percussive tool according FIG. 1.

Turning to FIG. 2, a cross-sectional view of the pneumatic percussive tool 10, the tool body 17 comprises a generally cylindrically-shaped cylinder cavity 28 coaxial with the tool body 17. The cylinder cavity 28 has a diameter adapted to slidably receive a piston 36, moveable between a first end 30 and a second end 32. The first end 30 of the cylinder cavity 28 located at the distal end 20 of the tool 10 is in communication with first attachment coupler 22 and has opening 37 passing therethrough. The proximal end 18 of the tool 10 can be defined by the housing 12. Received within the housing 12 is the second attachment coupling 24, a percussive valve assembly 40, and the second end 32 of the barrel 19. The second attachment coupling 24 and the percussive valve assembly 40 can be press fit into the housing 12 and securely held in place by the barrel 19 forming an air-tight closed end at the proximal end 18. In the event the percussive valve assembly 40 or threads 25 of the second attachment coupling 24 get damaged during use or operation, either component can be easily replaced due to the barrel 19 being screwed on and removably attached to the housing 12.

Adjacent the cavity 28 are a plurality of exhaust ports 42 extending laterally outwardly, and inclined toward the distal end 18, from the cylinder cavity 28 to an cylindrical exhaust muffler shield 39 positioned around the outside of the cylinder of the tool body 17. The cylindrical exhaust muffler shield 39 directs the air from the plurality of exhaust ports 42 out through the bottom of the handle 16 at exhaust exit port 35. The preferred embodiment comprises four exhaust ports 42 comprising elongated cylindrical passageways having a diameter adapted to control the exhaustion of pressurized air from the tool body 17.

The air intake connection 14 can be coupled via passageway 46, thru the trigger 26, and into cylinder cavity 28. The air intake connection 14 is adapted to couple to a conventional supply of pressurized air such as an air compressor (not shown) utilizing conventional pressure fittings. The trigger 26 is adapted to allow the passage of the air from the air intake connection 14 to the cylinder cavity 28 when the trigger 26 is activated, such as by manual depression.

In operation, the piston 36 slides bi-directionally within the cylinder cavity 28 between the first end 30 and second end 32 when pressurized air is introduced into the cylinder cavity 28 through an air supply passageway 46. A percussive valve assembly 40 is installed adjacent the second end 32 of the cylinder cavity 28. The percussive valve assembly 40 is adapted to deliver a selected volume of pressurized air into the cylinder cavity 28 sufficient to move the piston 36 in reciprocating linear fashion within the cylinder cavity 28.

For the percussive valve assembly to function properly, the opening 37 at the first attachment coupler 22 at the distal end 20 of the tool 10 generally must be plugged or capped. If the opening 37 is not capped or plugged, the air pressure created by the movement of the piston 36 will not be sufficient to properly activate the percussive cycle. In the embodiment where the percussive tool 10 exerts a pushing force, the tool 10 can be fitted with a typical bit such as a chisel bit (not shown) having an anvil end that is slidably inserted into the opening 37 at the distal end 20, thereby plugging the cylinder cavity 28 to control air pressure within the cavity 28. The anvil end of the bit protrudes into the cylinder cavity 28 a specified amount so that when the piston 36 is urged forward under pressure it strikes the anvil end of the bit. This impactive force moves the bit forward to perform its chiseling or cutting function and the piston 36 rebounds to the second end 32 of the cylinder cavity 28 to complete and repeat the percussive cycle.

Figure 3:
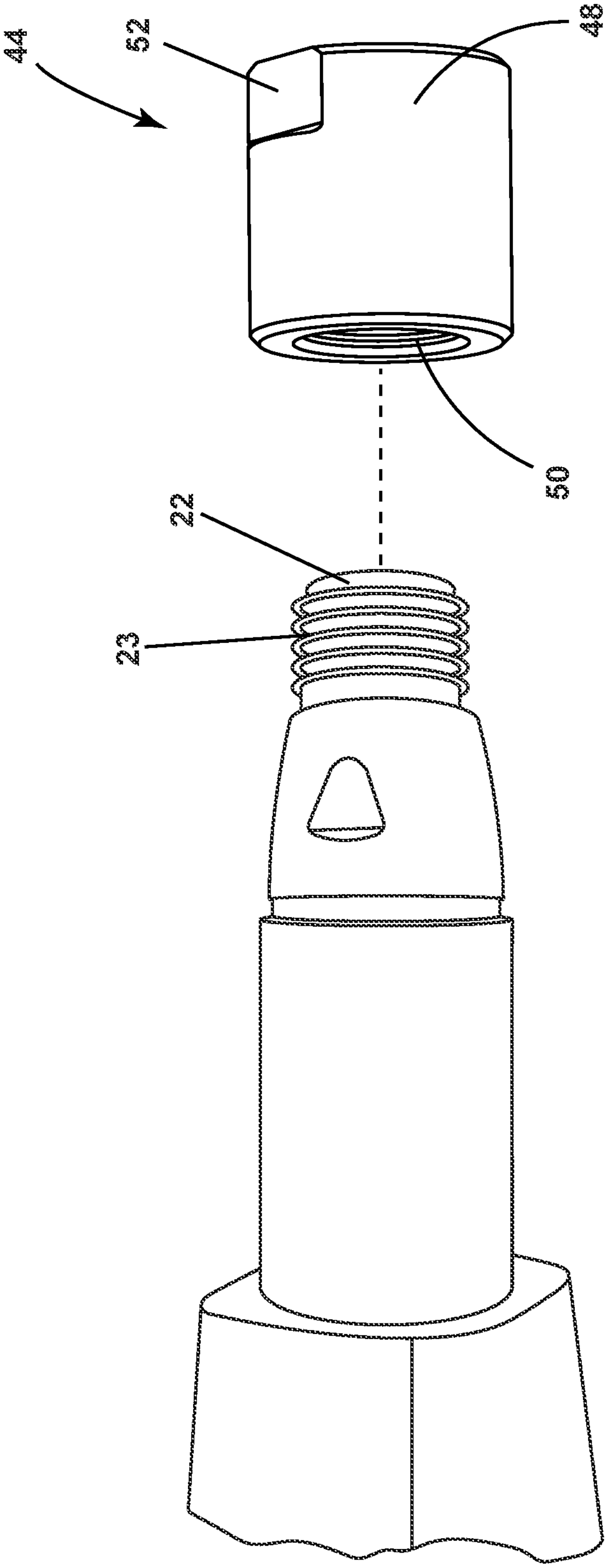
FIG. 3 is an exemplary illustration of an attachment for the distal end of the pneumatic percussive tool of FIG. 1.

FIG. 3 illustrates an exemplary attachment 44 in the shape of circular cap 48 for mating or attachment to the first attachment coupler 22 of the pneumatic percussive tool 10. The cap 48 acts as the chisel bit described above and caps or plugs the opening 37 in distal end 20 of the tool 10. As illustrated, the cap 48 can be a generally circular shape and configured to be mated to the first attachment coupler 22. The cap 48 can comprise a set of female threads 50 adapted to engage the male threads 23 on the first attachment coupler 22. In addition, the cap 48 can comprise a pair of opposing gripper walls 52 on the cap 48 for accommodating a tool for tightening the cap 48. As should be recognized, the cap 48 does not have an end that protrudes into the opening 37 of the tool 10. As a result, the piston 36 now strikes the first end 30 of the cylinder cavity 28 creating the impactive force that is transmitted thru the percussive tool body 17 and second attachment coupler 24 at the proximal end 18 of the tool 10. In this way, an attachment coupled to the second attachment coupler 24 at the proximal end 18 of the tool 10 will act with a pulling force. It is contemplated that the cap 48 can be made from steel of other metal or material sufficient to withstand the stresses associated with a pneumatic tool.

Figure 4:
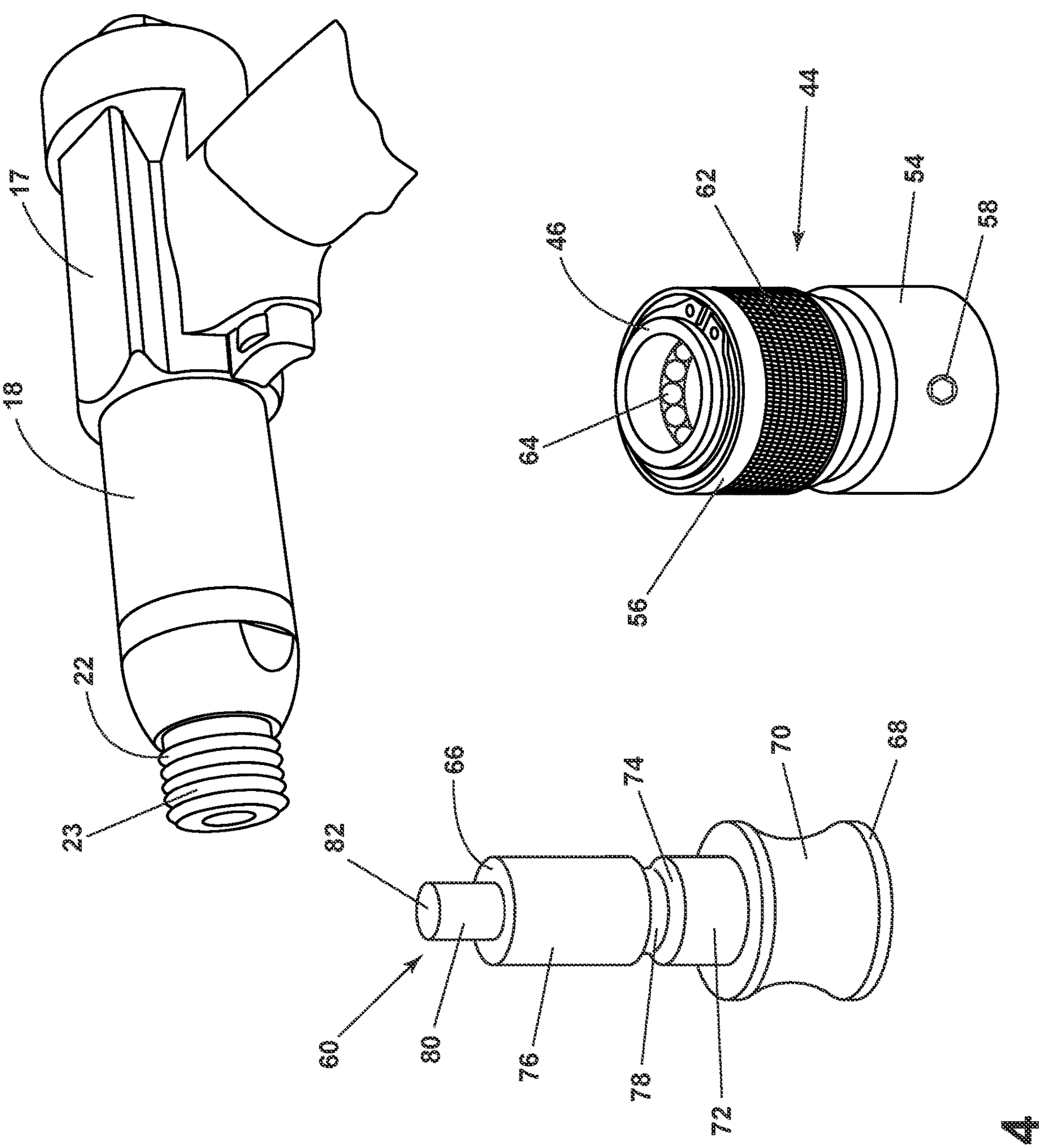
FIG. 4 is another exemplary illustration of an attachment for the distal end of the pneumatic percussive tool of FIG. 1.

FIG. 4 illustrates another exemplary embodiment of an attachment 44 for mating or connection to the first attachment coupler 22 located at the distal end 20 of pneumatic percussive tool 10. As illustrated, the attachment 44 can comprise a conventional quick change chuck 46 that once screwed on and tightened into place, allows one or more secondary attachments 60 to be easily replaced within the chuck 46. In more detail, the quick change chuck 46 comprises a first end 54 configured to be mated or attached to the first attachment coupler 22 of the tool 10. Like the cap 48, the first end 54 of the quick change chuck 46 comprises a set of female threads configured to engage the male threads 23 on the first attachment coupler 22. The first end 54 of the quick change chuck 46 can further comprise one or more set screws 58 for ensuring the chuck 46 is securely attached to the first attachment coupler 22. The second end 56 of the quick change chuck 46 allows for the one or more secondary attachments 60 to be easily removed and replaced. Conventional quick change chucks 46 comprise an outer casing 62 axially slidable relative to the chuck. The outer casing 62 covers a plurality of steel balls 64 moveable between locked and unlocked positions. In the locked position, the steel balls 64 engage and securely hold the secondary attachment 60, and in the unlocked position, the secondary attachment 60 is free to be removed from the chuck 46.

A secondary attachment 60 can be in the form of a pull plug 66 as also shown in FIG. 4 and contemplated by the present disclosure. As should be recognized, the pull plug 66, in combination with the quick change chuck 46 caps or plugs the opening 37 in distal end 20 of the tool 10, thus allowing the cylinder cavity 28 to sufficiently pressurize upon movement of the piston 36. As illustrated, the pull plug 66 has a first end 68 comprised of a head 70 with a concave shaped perimeter for easy gripping of the pull plug 66. The head 70 transitions to a shaft 72 having an upper end 74 and a lower end 76 separated by an engagement channel 78 that extends about the periphery of the shaft 72. The lower end 76 of the shaft 72 transitions to a narrower shaft 80 that forms a second end 82 of the pull plug 66. As should be recognized the second end 82 of the pull plug 66 can be inserted into the second end 56 of the quick change chuck 46. The outer casing 62 of the quick change chuck 46 can be slide toward the distal end 20 of the tool 10 unlocking and loosening steel balls 64 being held in place. The pull plug 66 can be inserted until the steel balls 64 align with the engagement channel 78. Once aligned, the outer casing 62 can be slide back to the locked position which causes the steel balls 62 to engage the engagement channel 78 and hold the pull plug 66 in the quick change chuck 46, thus capping the distal end 20 of the tool 10. In operation, the head 70 of the pull plug 66 also can act as a secondary handle to help manipulate the position of the pneumatic percussive tool 10. Since the pull plug 66 does not have contact with the piston 36, it is safe for a user to grip during operation.

Figure 5:
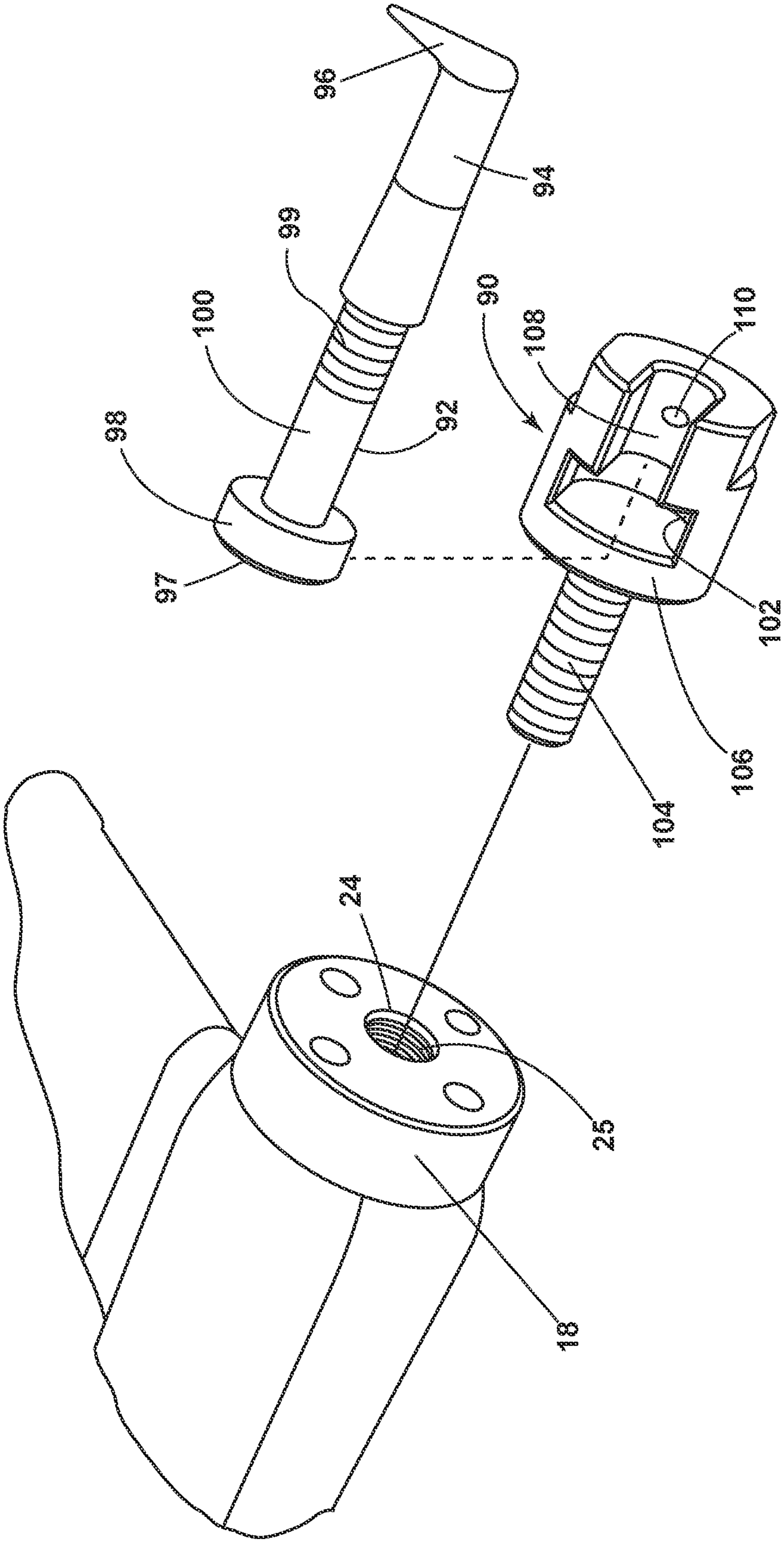
FIG. 5 is an exemplary illustration of a quick change receiver attachment and pull rod for a proximal end of the pneumatic percussive tool of FIG. 1.
Figure 6:
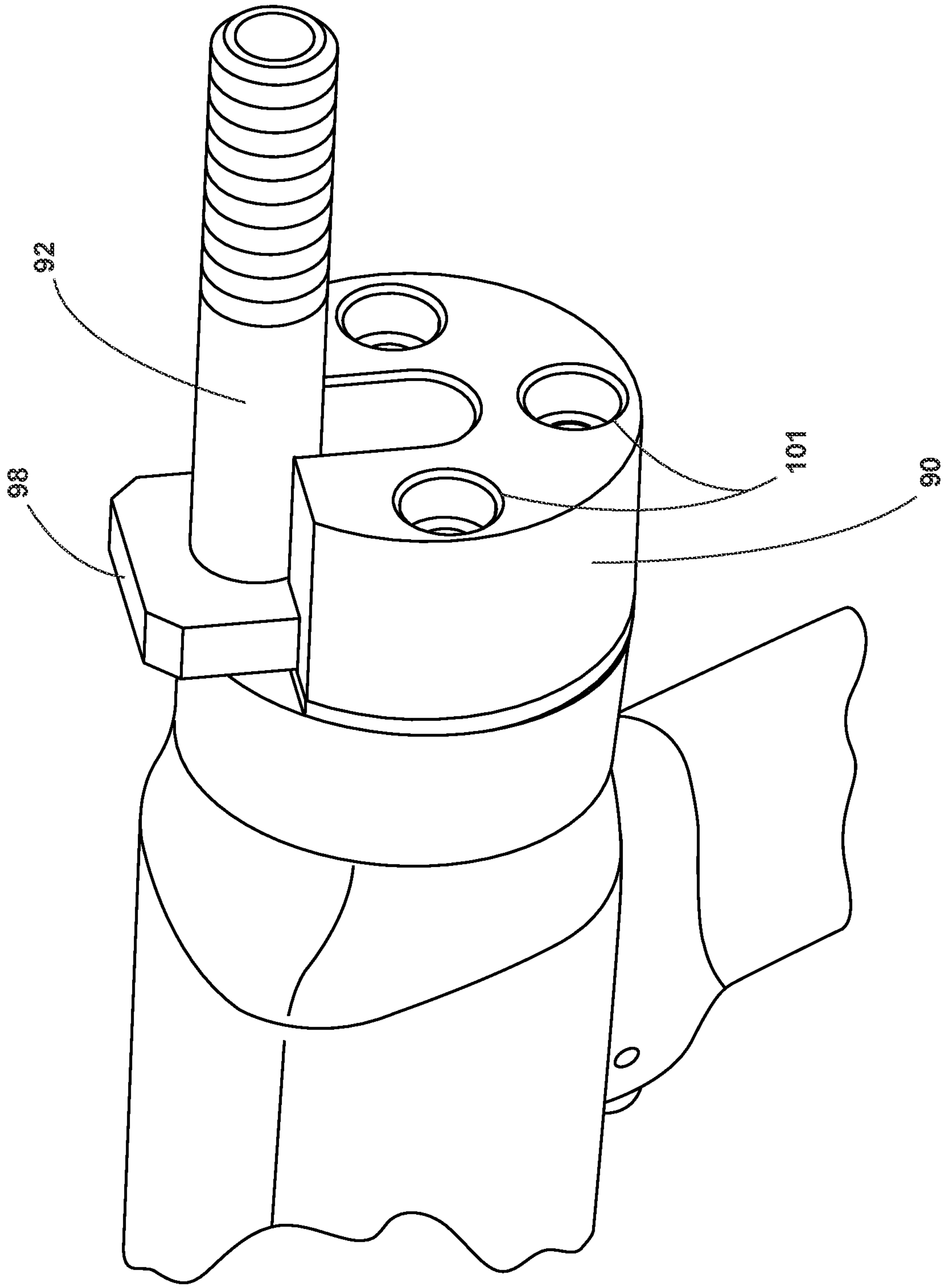
FIG. 6 is a is an exemplary illustration of the pull rod inserted in the quick change receiver attachment of FIG. 5 for a proximal end of the pneumatic percussive tool of FIG. 1.

FIGS. 5 and 6 illustrate a quick change receiver attachment 90 for the proximal end 18 of the pneumatic percussive tool 10 for simplifying connections to various pulling attachments 94. In other words, the quick change receiver 90 is provided at the proximal end 18 of the tool 10 and adapted to allow pulling attachments 94 such tools to be securely connected to the tool 10 during use, but easily removable and replaceable with other attachments or tools. As illustrated, the pull rod 92 can generally be an elongated rod-like member having a head 98 at a distal end 97 with a diameter that transitions to a shaft 100, having a smaller diameter than the head 98. The shaft 100 can be of various lengths or thicknesses and can have a threaded end 99 for the attachments of various pulling attachments. As illustrated, the attachment 94 is threadedly connected to shaft 100, but as should be recognized the attachment 94 can also be integral formed with the shaft 100 or could be removably connected or other connection mechanisms. It should be recognized that attachment 94 can have a proximal end 96 that comprises a foot, a J hook or any other ending configured to pry or pull an object. The attachment 94 can be made from steel or other durable material capable of withstanding the forces associated with pneumatic tools.

The head 98 of the pull rod 92 connection can have a diameter configured to be inserted in an engagement slot 102 on the quick change receiver 90. While the head 98 is shown as circular for allowing the pull rod 92 to turn within the quick change receiver 90, the head 98 of the pull rod 92 could be square, rectangular, star shaped or any other variety of other shapes. A non-circular shape for the head 98 of the pull rod 92 would prevent the pull rod 92 from rotating in the engagement slot 102, which may be preferable for some uses.

The quick change receiver 90 is configured to be attached or otherwise mated to the proximal end 18 of the percussive tool 10. In the embodiment illustrated, the quick change receiver 90 can be configured with an elongated threaded rod 104 for being screwed into the second attachment coupler 24. While illustrated as a threaded rod 104, it is contemplated that the quick change receiver 90 could be screwed, bolted, welded or otherwise securely attached to the proximal end of the percussive tool 10. For example, as shown in FIG. 6, the quick change receiver 90 could comprise one or more apertures 101, through which a plurality of screws could pass to securely attach the quick change receiver 90 to the tool 10.

The threaded rod 104 transitions to a body 106 having a generally circular shape and configured with engagement slot 102. In an exemplary embodiment, the engagement slot 102 comprises a T-shape for receiving the head 98 and a portion of the pull rod 92. In one aspect of the disclosure, the body 106 of the quick change receiver 90 further comprises a permanent magnet 110 located on an inner wall portion 108 of the body 106 opposite the T-shaped engagement slot 102 for holding the shaft 100 of the pull rod 92 against the inner surface 108 of the body 106. It should be recognized that use of a permanent magnet 110 is only one way of holding the pull rod 92 in the engagement slot 102. In other embodiments, the pull rod 92 could be friction fit, snap fit, or otherwise securely attached in the engagement slot 102. In addition, it is contemplated that the quick change receiver 90 can be made from steel of other metal or material sufficient to withstand the stresses associated with a pneumatic tool.

Figure 7:
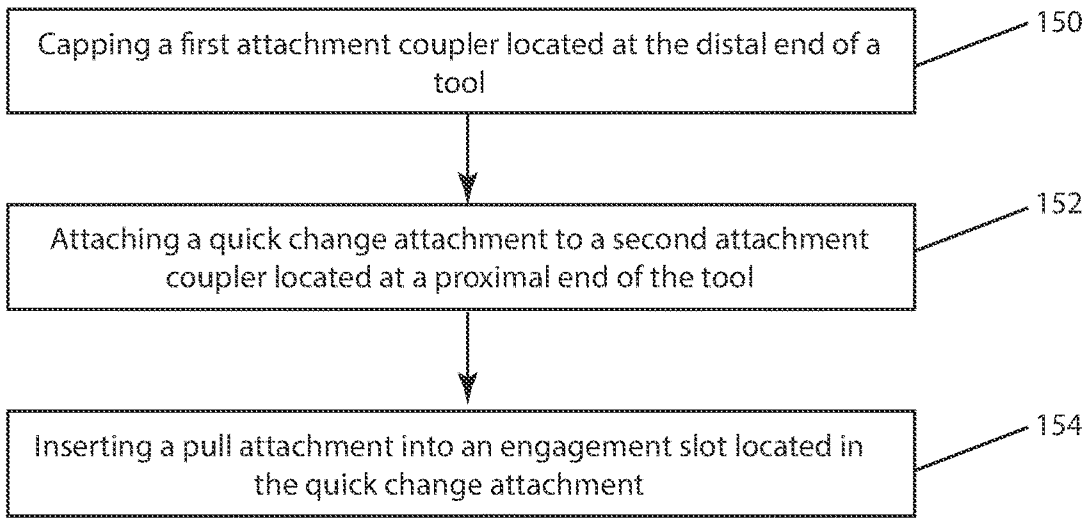
FIG. 7 is a method of converting a pneumatic percussive tool into a pneumatic percussive pulling tool.

FIG. 7 illustrates a method of converting a pneumatic percussive tool with proximal attachment means with a pushing force to a pneumatic percussive tool with a pulling force. The method comprises capping the first attachment coupler 22 located at the distal end of the tool. The capping step 150 can be accomplished by attaching or otherwise mating a cap to the first attachment coupler. Alternatively, the capping step 150 can be accomplished by attaching or otherwise mating a quick change chuck to the first attachment coupler and inserting a pull plug into the chuck.

Another step in the method of converting a pneumatic percussive tool with proximal attachment means with a pushing force to pneumatic percussive tool with a pulling force includes attaching or otherwise mating the quick change receiver to the second attachment coupler 24 located at a proximal end of the tool. The attaching or mating step 152 can be accomplished by screwing a quick change receiver having a threaded rod into the second attachment coupler. Alternatively, the quick change receiver could screwed, bolted, welded or otherwise attached to the proximal end 18 of the tool.

Another step in the method of converting a pneumatic percussive tool with proximal attachment means with a pushing force to pneumatic percussive tool with a pulling force includes inserting a pull attachment into an engagement slot 102 located in the quick change receiver. The pull attachment can comprise a pull rod having an annular head configured to be inserted into the engagement slot, which can be T-shaped. A permanent magnet can be configured to hold the pull rod in the engagement slot.

The unique invention described herein is easy to assemble and use. In the embodiments shown herein, the invention provides new attachments for attaching or mating to an existing pneumatic percussive tool which has proximal attachment means to convert it to a pulling tool and, in other embodiments, the attachment couplings provide the ability to quick change to different pulling tools. The invention eliminates the manual effort of having to screw in secure pulling tools, thus increasing speed and efficiency of using the tool.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

It should also be understood that all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

I claim:

1. A kit for converting a bi-directional pneumatic percussive tool from a pushing tool to a pulling tool, the tool having a tool body comprising a hollow interior with a distal end and a proximal end, a piston slidable in the hollow interior between the distal end and the proximal end, an opening positioned at the distal end of the tool in communication with the hollow interior, the kit comprising:

a removable end cap configured to selectively attach to the distal end of the tool and seal the opening and regulate air pressure within the hollow interior, the removable end cap configured to not protrude into the opening or into the hollow interior of the tool.

2. The kit of claim 1, further comprising a first attachment coupler comprising threads positioned on the distal end of the tool body for receiving the removable end cap.

3. The kit of claim 2, wherein the removable end cap further comprises threads for threading the end cap on the threads on first attachment coupler.

4. The kit of claim 3, wherein the removable end cap comprises a pair of opposing gripper walls at an outer end of the end cap for accommodating a tool for tightening the end cap.

5. The kit of claim 1, wherein the removable end cap is made of a hardened material such as steel.

6. The kit of claim 1, further comprising a quick change receiver attachment comprising a first end having a threaded rod configured to attach to the proximal end of the tool.

7. The kit of claim 6, wherein the quick change receiver attachment comprises a body having a T-shaped engagement slot.

8. The kit of claim 7, wherein the body of the quick change receiver attachment comprises a permanent magnet positioned opposite the T-shaped slot in an inner wall of the body.

9. A kit for converting a bi-directional pneumatic percussive tool from a pushing tool to a pulling tool, the tool having a tool body comprising a hollow interior with a distal end and a proximal end, a piston slidable in the hollow interior between the distal end and the proximal, an opening positioned at the distal end of the tool in communication with the hollow interior, the kit comprising:

a quick change chuck having a first end configured to selectively attach to the distal end of the tool and a second end comprising an axially slidable outer casing and a plurality of steel balls; and a pull plug configured to selectively attach to the second end of the quick change chuck to seal the opening and regulate an air pressure within the hollow interior; the pull plug comprising a first end configured to be inserted into the second end of the quick change chuck and having a channel for engagement with the plurality of steel balls; the first end of the pull plug protruding into the quick change chuck but not protruding into the opening or into the hollow interior of the tool.

10. The kit of claim 9, further comprising a first attachment coupler comprising threads positioned on the distal end of the tool body for receiving the quick change chuck.

11. The kit of claim 10, wherein the first end of the quick change chuck further comprises threads for threading the quick change chuck on the threads of the first attachment coupler.

12. The kit of claim 9, wherein the pull plug is made of a hardened material such as steel.

13. The kit of claim 9, wherein the pull plug comprises a head with a concave shaped perimeter for gripping during operation of the tool.

14. The kit of claim 13, wherein the pull plug comprises a first shaft that transitions from the head and comprises an upper end and a lower end and wherein the channel separates the upper end and lower end.

15. The kit of claim 9, further comprising a quick change receiver attachment comprising a first end having a threaded rod configured to attach to the proximal end of the tool.

16. The kit of claim 15, wherein the quick change receiver attachment comprises a body having a T-shaped engagement slot.

17. The kit of claim 16, wherein the body of the quick change receiver attachment comprises a permanent magnet positioned opposite the T-shaped slot in an inner wall of the body.

18. A kit for converting a bi-directional pneumatic percussive tool from a pushing tool to a pulling tool, the tool having a tool body comprising a hollow interior with a distal end and a proximal end, a piston slidable in the hollow interior between the distal end and the proximal, an opening positioned at the distal end of the tool adjacent a first attachment coupler in communication with the hollow interior, the kit comprising:

a pull plug configured to selectively attach to the distal end of the tool to seal the opening and regulate an air pressure within the hollow interior; the pull plug comprising a first end configured to be inserted into the distal end of the tool but not protruding into the opening or into the hollow interior of the tool.

19. The kit of claim 18, wherein the pull plug comprises a head with a concave shaped perimeter for gripping during operation of the tool.

20. The kit of claim 19, wherein the pull plug comprises a first shaft that transitions from the head and comprises an upper end and a lower end and wherein a channel separates the upper end and lower end.

* * * * *